Jan. 21, 1958 W. STELZER 2,820,345
BOOSTER BRAKE MECHANISM
Filed Dec. 14, 1953
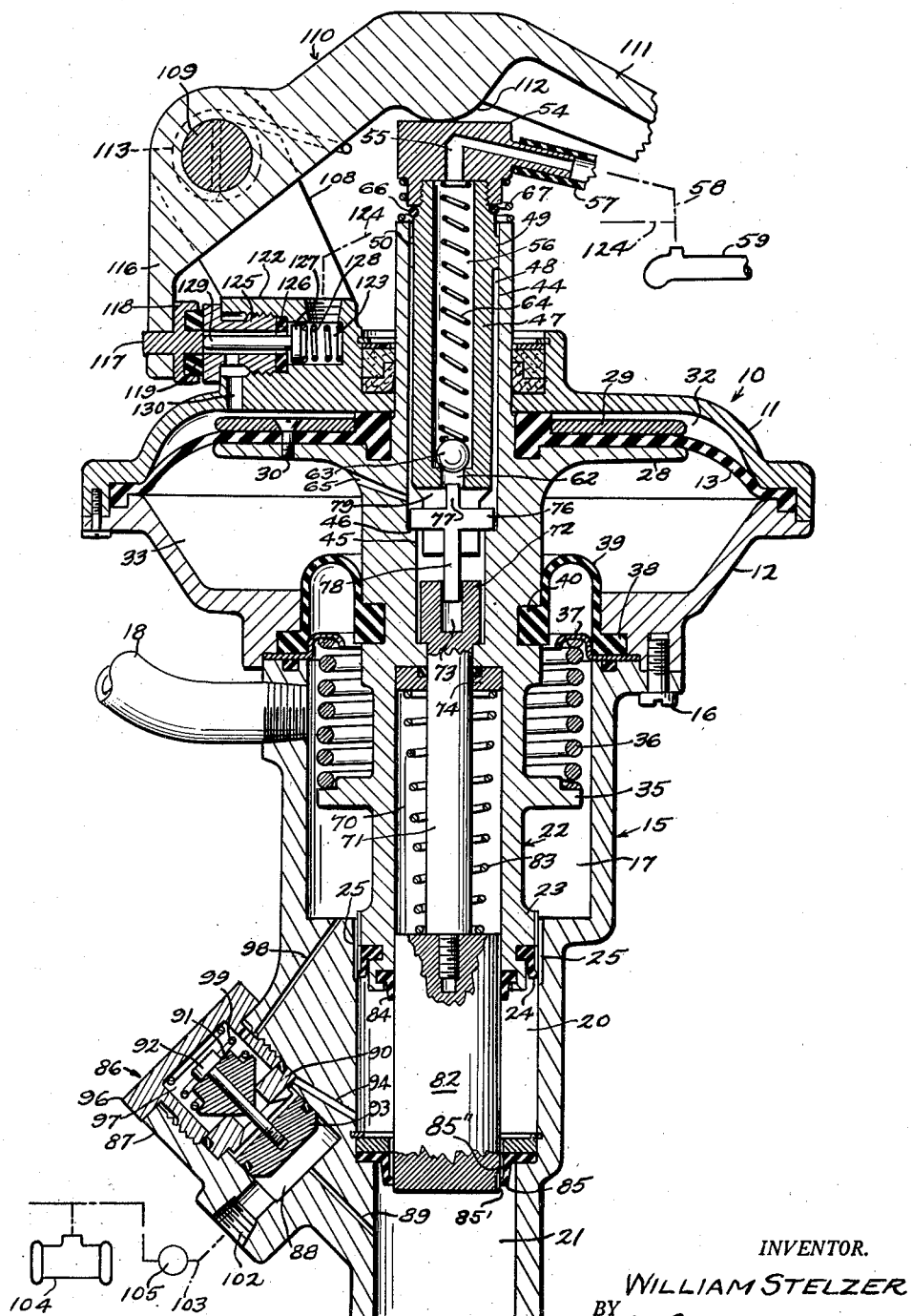
INVENTOR.
WILLIAM STELZER
BY
John V. Phillips
ATTORNEY

United States Patent Office 2,820,345
Patented Jan. 21, 1958

2,820,345

BOOSTER BRAKE MECHANISM

William Stelzer, Summit, N. J.

Application December 14, 1953, Serial No. 397,852

15 Claims. (Cl. 60—54.6)

This invention relates to a booster brake mechanism and more particularly to a two-stage booster for operating the brakes of a motor vehicle, and is an improvement over the apparatus shown in my copending application Serial No. 397,851, filed December 14, 1953.

As stated in my copending application referred to, it is now the common practice to provide fluid pressure operated booster brakes for motor vehicles, having associated therewith a low operating treadle to facilitate the operation of the brakes. One of the serious drawbacks involved in such constructions lies in the fact that it requires the exertion of very substantial force by the operator on the brake treadle, in the event of a failure of power for the booster motor, in order to apply the brakes.

In my copending application referred to, I have shown a novel construction for overcoming the difficulty referred to by providing a power-controlled master cylinder of the two-stage type which employs a helper spring utilized for biasing the fluid displacing means in a fluid displacing direction and normally held compressed by a differential fluid pressure motor which is energized for this purpose when the brake treadle is in normal off position. In the copending application referred to, depression of the brake treadle de-energizes the fluid motor to render the compressed spring operative for expending its force to displace brake fluid into the wheel cylinders. Moreover, the spring is effective upon a power failure to displace from the master cylinder sufficient fluid to move the brake shoes into light engagement with the drums, thus rendering practicable the use of a small diameter fluid displacing element, directly operated by the treadle, for applying relatively high pressures with a low treadle lever ratio and without the assistance of a booster motor.

An important object of the present invention is to improve the construction of the copending application referred to, by providing a booster brake mechanism wherein a helper spring is employed as in the previous case, but wherein the fluid motor, normally energized for retaining the helper spring compressed when the parts are in the off position, is reversely energized to power-assist in the application of the brakes.

A further object is to provide such a mechanism which is particularly adapted for use in braking systems using a low pedal or treadle wherein insufficient foot pressure can be produced by prior systems to manually stop the vehicle in the event of a failure of power in the fluid motor, the present construction being such as to facilitate foot operation of the brakes in the event of a power failure and to assist the foot pressure in applying the brakes by adding to the foot pressure the forces present in the fluid motor, which is reversely energized upon operation of the brake treadle.

A further object is to provide a booster mechanism of the type referred to, wherein the single fluid motor employed performs the duties of two motors, one for normally retaining the helper spring compressed and the other for assisting foot pressure in applying the brakes.

A further object is to provide such a mechanism where-in reverse energization of the motor helps to set the brakes more rapidly and eliminates the resistance due to inertia forces when the pedal or treadle is rapidly depressed.

Other objects and advantages of the invention will become apparent during the following description.

In the drawing I have shown one embodiment of the invention. In this showing:

The figure is an axial sectional view through a vertically mounted booster mechanism embodying the invention, parts being broken away and parts being diagrammatically shown.

Referring to the drawing, the numeral 10 designates a fluid pressure operated motor as a whole shown in the present instance as having its axis vertically arranged. The motor comprises an upper casing section 11 and a lower casing section 12 having clamped therebetween the peripheral portion of a diaphragm 13 constituting the pressure-movable unit of the motor and further referred to below.

A master cylinder indicated as a whole by the numeral 15 is fixed below the motor 10 in axial alignment therewith and is fixed at its upper end as at 16 to the casing section 12. The master cylinder 15 is provided in its upper end with a chamber 17 constituting an hydraulic fluid reservoir communicating with a stand pipe 18 of any suitable type.

The master cylinder 15 further comprises a pair of cylinders 20 and 21, the former of which is of larger diameter than the cylinder 21. A reciprocating unit 22 is arranged as shown in the drawing and comprises a lower piston 23 reciprocable in the cylinder 20. The piston 23 and the parts connected thereto normally occupy the off positions shown in the drawing. A flexible lipped seal 24 is carried by the piston 23, and when the parts are in the off position shown, the reservoir 17 communicates with the cylinder 20 through two small by-pass grooves 25 opening into the cylinder 20 just below the seal 24 for a purpose to be described.

Below the diaphragm 13 and in engagement therewith, the reciprocating unit 22 is provided with an annular flange 28. Above the diaphragm 13 is arranged a clamping plate 29 secured through the diaphragm 13 to the flange 28 by screws or the like 30. It will be apparent that the diaphragm 13 divides the motor 10 to form an upper pressure chamber 32 and a lower pressure chamber 33. Pressures in these chambers are controlled in a manner to be described.

Within the reservoir 17, the unit 22 is provided with an outstanding annular flange 35 forming a seat for the lower end of a helper spring 36, the upper end of which engages a seat 37 fixed between the casing section 12 and the adjacent end of the master cylinder. Fixed between the same elements is the peripheral flange 38 of a diaphragm 39, such diaphragm having an inner peripheral flange 40 engaging a suitable groove in the unit 22. The diaphragm 39 forms a flexible dividing wall between the reservoir 17 and motor chamber 33.

The upper end portion of the unit 22 is provided with a co-axial bore 44 communicating with a lower reduced diameter coaxial bore 45, thus forming a shoulder 46 at the lower end of the bore 44. A plunger 47 is arranged in the bore 44 and is of smaller diameter than such bore to provide an annular air passage 48. The plunger 47 is provided with an outstanding flange 49 engaging the wall of the bore 44 to support the plunger 47 for axial movement therein, and such flange is grooved as at 50 to admit air into the passage 48 in a manner to be described.

The plunger 47 is provided at its upper end with a cap 54 provided with a vacuum passage 55 communicating with an internal bore 56 in the plunger 47. The cap 54 is connected by means of a flexible hose member 57 to a line 58 leading to the intake manifold 59 of the motor vehicle engine to serve as a source of vacuum.

The bore 56 is provided at its lower end with a port 62, the upper end of which forms a seat engageable with a ball valve 63 urged downwardly by a compression spring 64. This valve is normally closed in the off position of the parts as shown in the drawing, and is adapted to be opened by means to be described to connect to the manifold 59 the space beneath the plunger 47. This space is in fixed communication with the motor chamber 33 through a passage 65.

In the off positions of the parts, atmospheric pressure is maintained in the chamber 33 through passages 65 and 48. The controlling of the admission of air into the latter passage is accomplished by means of a deformable annular seal in the form of an O-ring 66 surrounding the plunger 47 beneath the cap 54. The O-ring 66 is maintained above the upper extremity of the annular passage 48 by a coil spring 67, and accordingly, the upper end of the annular passage 48 is normally open to the atmosphere.

The unit 22 is provided in its lower end with a cylindrical bore 70 in which is arranged a rod 71 carrying at its upper end a head 72 provided with an axial recess 73. In the upper end of the bore 70 is arranged a sealed bearing 74 through which the rod 71 projects. A valve operating element is provided for the ball valve 63. Such element is in the form of a cross having a horizontal portion 76 normally seating on the shoulder 46. The vertical portion of the cross includes an upper projection 77 movable through the port 62 to engage the ball 63. The lower end 78 of the vertical portion of the cross is loosely slidable in the recess 73. The valve operating element referred to may be stamped from a single sheet of metal and has its upper portion arranged in a slot 79 formed in the lower end of the plunger 47.

At its lower end, the rod 71 carries a plunger 82, the upper end of which is arranged in the bore 70. A coil spring 83 is seated at its lower end on the top of the plunger 82 and has its upper end engaging the bearing 74. The plunger 82 slides through a lipped seal 84 carried by the lower end of the unit 22. The plunger 82 also slides through a lipped seal 85 arranged between the cylinders 20 and 21. The lower end of the plunger 82, the seal 85 and its conventional retaining washer are grooved as at 85' to communicate between the cylinders 20 and 21 when the parts are in off position.

A control valve mechanism indicated as a whole by the numeral 86 is carried by the lower end of the master cylinder. This mechanism comprises a body 87 preferably integral with the master cylinder and provided therein with a cylinder 88 communicating with the cylinder 21 through a relatively restricted passage 89. A valve seat 90 is seated at the upper end of the cylinder 88 and is engageable by a tapered valve 91 carried by a stem 92, to the lower end of which is fixed a piston 93 slidable into cylinder 88. The space between the valve seat 90 and piston 93 communicates with the cylinder 20 through a passage 94.

A plug 96 is threaded into the body 87 and forms therewith a chamber 97 having restricted communication with the reservoir 17 through restricted passage 98. A spring 99 urges the valve 91 toward its seat.

The cylinder 88 has an outlet port 102 connected to a pipe line 103 leading to the brake cylinders, one of which is indicated by the numeral 104. A conventional residual pressure valve 105 may be arranged in the line 103.

Novel pedal means and associated elements are provided for the actuation of the plunger 47 and for controlling pressures in the motor chamber 32. The casing section 11 is provided with preferably integral ears 108 carrying a pivot pin 109 pivotally supporting a pedal lever indicated as a whole by the numeral 110. This lever includes a lever arm 111 to which a pedal pad is connected (not shown), and the underside of this lever arm is provided with a projection 112 having a curved face engaging the top of the cap 54. The lever 111 is biased for turning movement in a counterclockwise direction to the normal position shown in the drawing by a torsion spring 113 having one end engaging the lever and the other end projecting through the shaft or pin 109, which is fixed to the ears 108.

The lever 110 further includes a depending arm 116 carrying a stem 117 to which is connected a cup 118 having arranged therein a deformable annular valve 119.

The casing member 11 is provided with an integral upstanding portion 122 in which is formed a chamber 123 communicating with a branch line 124 leading to the vacum line 58, and accordingly, vacuum is always present in the chamber 123. A plug 125 is threaded in the portion 122 and is provided at its inner end with a flexible seal 126 engageable by a valve 127 urged toward closed position by a spring 128. The valve 127 carries a stem 129 engageable by the inner end of the stem 117 to normally maintain the valve 127 open in opposition to the spring 128.

The stem 129 fits loosely into the plug 125 to form a passage communicating with the motor chamber 32 through suitable port means 130. With the valve 127 in the normal off position shown, vacuum will be present in the motor chamber 32. Under the same conditions, the valve 63 will be closed and the upper end of the passage 48 will be open to the atmosphere. Accordingly, the motor chamber 33 will be open to the atmosphere, and differential pressures will hold the diaphragm 13 and associated parts in their upper positions shown, maintaining the spring 36 compressed.

It will be apparent that the arrangement of the mechanism with its axis vertical minimizes the horizontal space required for the installation of the device. The device is supported adjacent the toe board or fire wall of the vehicle by suitable bracket means (not shown) and the lever arm 111 will project through a suitable slot in the fire wall of the vehicle to render the pedal pad (not shown) readily accessible for operation. The lever arm 111 facilitates the provision thereon of a low pedal pad for the easy transferring of the operator's foot from the accelerator pedal to the brake pedal.

*Operation*

The parts normally occupy the positions shown in the drawing, as stated above. When the brakes are to be applied, the pedal pad is depressed to move the lever arm downwardly, thus moving the depending arm 116 toward the left, whereupon the valve 127 closes to disconnect the motor chamber 32 from the source of vacuum. Substantially simultaneously therewith, the deformable valve 119 will be opened. In this connection, it will be noted that this valve is deformed in the closed position, and the movement referred to therefore does not unseat the valve 119 until after the valve 127 has been seated, or these operations take place simultaneously. The valve 127 has an extremely small lift, which is all that is necessary in view of the small volume of the motor chamber 32.

The unseating of the valve 119 admits air around the stem 129 and through port 130 into the motor chamber 32, while atmospheric pressure was already present in the motor chamber 33. Accordingly, the unit 22 starts to move downwardly by virtue of the spring 36, which exerts a constant downward force not dependent upon the pressure level of the vacuum source. Immediately after the opening of the valve 119, the valve seal 66 enters the bore 44, although it will be apparent that this action may take place simultaneously with the opening of the valve 119. Such movement of the valve seal 66 disconnects the annular passage 48 from the atmosphere, and accordingly, closes the motor chamber 33 to the atmosphere.

Downward movement of unit 22, results in downward movement of piston 23, and after a short increment of movement, the seal 24 closes the lower ends of the grooves 25 to disconnect the cylinder 20 from the reservoir 17. Hydraulic fluid in the cylinder 20 then will be placed under pressure.

Further movement of the pedal, which moves the plunger 47 downwardly, will bring the projection 77 of the valve operating element into engagement with the ball valve 63, thus unseating this ball and connecting the motor chamber 33 to the source of vacuum. It will be apparent that the valve elements 63 and 66 provide for a follow-up action of the unit 22 relative to the pedal lever 110.

At this stage of the operation of the device, the lower end of the plunger 47, at the bottom of the groove 79, comes into proximity with the head 72 and may or may not at this time contact such head. As the unit 22 moves downwardly, the spring 83 urges the plunger 82 downwardly to tend to keep the head 72 seated in the bottom of the bore 45. The purpose of this spring is to delay the transmission of reaction pressures to the brake pedal, as further described below, while the brake shoes are being expanded and prior to any vehicle deceleration.

As the piston 23 descends, fluid will be displaced from the cylinder 20 past the seal 85 into the cylinder 21. The plunger 82 also will be moving downwardly to displace the fluid from the cylinder 21, and when pressure in this cylinder reaches a predetermined point, such pressure will react upwardly on the plunger 82, thus causing the head 72 to seat solidly against the bottom of the plunger 47. Accordingly, hydraulic pressures in the cylinder 21 will be reacted to the pedal lever to provide such lever with an accurate degree of "feel."

From the cylinder 21, hydraulic fluid is displaced through passage 89 into chamber 88, thence through the line 103 to the brake cylinders.

It will be noted that the pressure in chamber 20 will be communicated to chamber 21 because the fluid bypasses seal 85; therefore the pressure in the two chambers is the same. While a substantial volume of fluid is transmitted to the brake cylinders via restricted passage 89 and no fluid flow exists in passage 94 as spring 99 holds valve 91 shut, a differential pressure acts on piston 93 because the pressure below piston 93 is reduced due to the pressure loss caused by passage 89 and port 102. Piston 93 thus functions to prevent premature opening of valve 91 if the pedal is depressed violently and a higher pressure is produced in cylinders 20 and 21 which, if it were not for piston 93, would be sufficient to unseat valve 91 and bypass to the reservoir. Due to the pressure drop in passage 89 and the resulting differential pressure acting on piston 93, the latter holds valve 91 firmly seated. If for any reason during a brake application the pressure in chamber 21 were higher than in chamber 20, piston 93 would move upwardly and rest against seat 90 but this would not unseat valve 91, since stud 92 is snugly slidable in the central bore of valve 91.

During depression of the brake pedal, piston 23 continues to descend in a follow-up action with piston 82 to transmit fluid from chamber 20 past seal 85 to the wheel cylinders to increase the braking pressures. Thus piston 23 descends not only by force of spring 36, but by power of the motor mechanism as the vacuum in chamber 33 is increased so that piston 23 keeps up with piston 82. When a predetermined pressure is reached in chambers 20 and 21, preferably before full evacuation of chamber 33, i. e., before power run-out of the motor mechanism, and the flow of fluid to the wheel cylinders has become negligible as the brakes are applied, spring 99 yields to the pressure on valve 91 so that the latter opens and fluid displaced by piston 23 as it continues to follow piston 82 is by-passed to reservoir 17. The mechanism thus is in the second stage where only fluid displaced by piston 82 is transmitted to the brake cylinders.

It will be apparent that in the initial stages of operation, a substantial volume of fluid will be displaced from cylinders 20 and 21 to set the brake shoes. The piston 82, accordingly, is not required by itself to displace substantial quantities of fluid. The plunger 82 thus may be made of relatively small diameter to enable the operator, without substantial force, to apply the vehicle brakes by manual effort.

It will be noted that the reaction on the pedal will not have changed in any way, the "feel" in the brake pedal being solely that caused by hydraulic pressure reaction against the plunger 82, which is always operated by foot power.

In the retractile movement of the parts, the release of pedal 110 permits piston 82 and plunger 47 to rise in yielding to the pressure in chamber 21 so that a certain amount of fluid returns from the brake cylinders. The upward movement of plunger 47 first seats ball 63 as it moves away from member 77; further upward movement of plunger 47 moves seal 66 out of bore 44 to let air into chamber 32. At this stage unit 22 is held down only by spring 36. Further upward movement of piston 82 compresses spring 83.

When the pedal lever 110 reaches its normal off position, the valve 119 will close the motor chamber 32 to the atmosphere, and the valve 127 will be opened to connect such motor chamber to the intake manifold, whereupon all of the parts will be returned to normal position and spring 36 will be compressed.

If the spring 83 is stronger than the spring 36, the piston 23 and plunger 82, after the closing of the valve 63, will move upwardly in unison. It will be noted that there is a small groove 85' in the plunger 82 communicating with an annular space 85" within the seal 85, and when the piston 82 reaches the position shown in the drawing relative to the seal 85, fluid will flow from cylinder 21 to cylinder 20, and the remaining pressure in the wheel cylinders is relieved into the cylinder 20 and thence into reservoir 17 through the grooves 25 when the unit 22 reaches its normal off position.

As previously stated, the spring 36 is only of sufficient strength to cause sufficient fluid displacement to take up play between the brake shoes and drums, and not to effect appreciable brake application. In the event of a failure of power in the motor, atmospheric pressure will exist in the motor chamber 32. Pressures accordingly will be balanced on opposite sides of the diaphragm 13, whereupon the spring 36 will move the unit 22 downwardly to the extent necessary to move the brake shoes into light and negligible engagement with the brake drums. The force exerted by the spring 36 alone, of course, is materially less than the force exerted during brake application with power available. In such case, the spring 36 has added to its force the reversed differential in motor 10. Motor 10 thus helps to set the brakes more rapidly and eliminates the resistance due to inertia forces when the pedal is depressed rapidly. With no power present, the spring 36 acts alone. If the brake pedal is then depressed to apply the brakes, only a negligible additional movement of the pedal pad is necessary to move the plunger 82 to set the brakes. A failure in power, therefore, is not a serious matter, and no greater force need be exerted against the pedal pad to set the brakes than is necessary when vacuum is available for the motor chamber 32.

In the present instance, the fluid pressure operated motor is required to be of only such capacity as to normally compress the spring 36. Thus, the use of a vacuum motor of smaller diameter is rendered wholly practicable. It also will be apparent that the spring 36 is rendered operative for performing its intended function merely by balancing pressures in the motor chambers, and accordingly, in the operation of the brake pedal, no "lumpiness" is encountered, all of the braking forces being generated by the foot of the operator.

It is to be understood that the form of the invention shown and described is for the purpose of illustrating a

I claim:

1. A booster brake mechanism comprising a master cylinder having a first hydraulic chamber, a first fluid displacing member movable into said chamber to displace fluid therefrom, pedal operable means operatively connected to the displacing member for transmitting movement to said fluid displacing member, a second hydraulic fluid chamber communicable with the first chamber, a second fluid displacing member movable in said second hydraulic fluid chamber to displace fluid therefrom, conduit means communicating with said second hydraulic fluid chamber for conveying fluid to vehicle wheel cylinders from said chambers, biasing means normally urging said second fluid displacing member toward fluid displacing movement in said second fluid chamber, power means connected to said second fluid displacing member normally acting in opposition to the biasing means, control means operatively connected to said power means, a power source normally communicated to the power means through the control means, said pedal operable means operatively engaging said control means whereby actuation of said pedal operable means from a normal off position renders said biasing means operative for moving said second fluid displacing member into its respective fluid chamber, said control means connecting said power means to said power source upon return of said pedal operable means to said normal off position and subsequently rendering said biasing means ineffective.

2. Apparatus according to claim 1 wherein said power means comprises a fluid motor having a pressure responsive unit connected to said second fluid displacing member and wherein said power source is a source of fluid pressure, said control means comprising valve means controlling said motor including means communicating said motor to said source of fluid pressure when said pedal operable means is in said normal off position.

3. A booster brake mechanism comprising a master cylinder having a chamber with an outlet for communication with vehicle wheel cylinders, a high pressure fluid displacing member including a portion movable into said chamber and effective to displace a small volume of fluid to the wheel cylinders, pedal operable means operatively connected to said member for moving said fluid displacing member, a second hydraulic fluid chamber, a low pressure fluid displacing member including a portion movable into said second fluid chamber and effective to displace a large volume of fluid to said wheel cylinders, said second chamber including means communicable with said first mentioned chamber and effective for permitting transmission of pressurized hydraulic fluid to the wheel cylinders through said second chamber, biasing means normally engaging said low pressure fluid displacing member and tending to urge the same from a normal off position to displace fluid from said second fluid chamber, power means connected to said low pressure fluid displacing member and controlled by said pedal operable means and normally acting in opposition to said biasing means and rendering the biasing means inoperative, and control means operatively connected to and actuated by said pedal operable means for de-energizing said power means upon movement of said pedal operable means from said normal off position.

4. Apparatus according to claim 3 wherein said power means comprises a fluid motor having a pressure responsive unit therein subject to differential pressures, and the control means includes a control valve device including a fluid connection communicating with said motor and with a differential pressure source and with the atmosphere for activating said motor when said pedal operable means is in said normal off position, said control valve device cutting off the differential pressure source in response to movement of said pedal operable means when said pedal operable means is moved from said normal off position to de-energize said motor and to automatically render said biasing means effective for moving said second fluid displacing member.

5. A booster brake mechanism comprising a master cylinder having a first hydraulic fluid chamber, a first fluid displacing member movable into said chamber to displace fluid into vehicle brake cylinders, a second hydraulic fluid chamber, a second fluid displacing member movable thereinto from a normal off position to displace fluid into said first hydraulic fluid chamber, energy storing means connected to bias said second fluid displacing member from said normal off position, a fluid motor having a pressure responsive unit connected to said second fluid displacing member, a pedal, a pedal operable member operatively connected to said pedal and including a lost motion connection operatively associated with said first fluid displacing member and with said pedal permitting limited relative movement between the pedal and pedal operable member during initial actuation of said pedal, and valve means connected to be operated by said pedal operable member and having fluid connection with said motor, with the atmosphere and with a differential pressure source and including means operated by the pedal to establish differential pressures in said motor when said pedal is in a normal off position to restrain said energy storing means and render the latter ineffective for moving said second fluid displacing member, said valve means being movable when said pedal is moved from said normal off position for de-energizing said motor to render said energy storing means effective to release stored energy for moving said second fluid displacing member.

6. Apparatus according to claim 5 wherein said pressure responsive unit divides said motor to form a pair of opposed fluid pressure chambers, said valve means including means operable when said pedal is in said normal position connecting one of said chambers to said differential pressure source, and disconnecting such chamber from said source upon movement of said pedal from said normal position, and an auxiliary valve mechanism including means operatively connected to said pedal to connect the other chamber of said motor to said differential pressure source when said pedal is moved from said normal position.

7. Apparatus according to claim 5 provided with a hydraulic fluid reservoir communicable with said chambers past the fluid displacing members, duct means connected at one end to said second hydraulic fluid chamber and at its other end to said reservoir, and a pressure responsive valve in said duct means subject to pressures in said one end of said duct means operable when such pressures reach a predetermined point to bypass fluid from said second hydraulic fluid chamber to said reservoir.

8. Apparatus according to claim 5 provided with a hydraulic fluid reservoir, duct means connected at one end to said second hydraulic fluid chamber and at its other end to said reservoir, a pressure responsive valve in said duct means subject to pressure in said one end of said duct means to be opened when such pressures reach a predetermined point to bypass fluid from said second hydraulic fluid chamber to said reservoir, a control cylinder having a piston therein connected to said pressure responsive valve, one end of said control cylinder being connected to said first hydraulic fluid chamber and the other end forming a part of said duct means between said pressure responsive valve and said second hydraulic fluid chamber, whereby, when pressures build up in said duct means from said second hydraulic fluid chamber at a rapid rate relative to increased pressures in the first-named end of said control cylinder, differential pressures affecting said piston will hold said pressure responsive valve in said closed position.

9. A booster brake mechanism comprising a master cylinder having a hydraulic fluid chamber provided with an outlet duct for conveying fluid to vehicle wheel cylinders, a first fluid displacing member movable into said chamber to displace fluid therefrom, a hydraulic fluid cylinder, a second fluid displacing member movable into said cylinder for displacing fluid therefrom into said hydraulic fluid chamber, an energy storing spring connected to bias said second fluid displacing member for movement from a normal off position to displace fluid from said fluid cylinder, a fluid motor including a casing and a pressure responsive unit dividing said casing to form first and second motor chambers, pedal operable means operatively connected to said first fluid displacing member for actuating the same, an actuating pedal operatively connected to said pedal operable means, and control valve means operatively connected to said actuating pedal and said pedal operable means and having fluid connection with said motor chambers and with sources of relatively high and low pressures and operative when said pedal is in a normal off position for connecting said first motor chamber to the source of relatively low pressure and said second motor chamber to the source of relatively high pressure for urging said pressure responsive unit in one direction and to restrain said spring and render it inoperative, said valve means being operative upon movement of said pedal from said normal off position for connecting said first motor chamber to the source of high pressure and the second motor chamber to the source of low pressure and moving said pressure responsive unit in the other direction to assist said energy storing spring in moving said second fluid displacing member.

10. Apparatus according to claim 9 including a lost motion connection between said pedal operable means and said first fluid displacing member, said pedal being movable from said normal off position to connect said first chamber to said source of high pressure and said second chamber to said source of low pressure prior to transmitting movement to said first fluid displacing member.

11. Apparatus according to claim 9 wherein said valve means comprises a pair of valve devices, one of which is operatively connected to said pedal and communicates said first chamber to said source of low pressure when said pedal is in said normal off position, said one valve device being operative upon movement of said brake pedal from said normal off position to connect said first chamber to said source of higher pressure, the other valve device being operative when said pedal is in said normal off position to connect said second motor chamber to said source of higher pressure and being operative in response to movement of said pedal operable member when said pedal moves from said normal off position for communicating said second motor chamber to said source of low pressure.

12. Apparatus according to claim 11 wherein said pedal operable means includes a lost motion connection with said first fluid displacing member permitting said pedal to move from said normal off position a predetermined extent before actuating said first fluid displacing member during which movement said other valve device connects said second motor chamber to said source of low pressure.

13. Apparatus according to claim 9 provided with a hydraulic fluid reservoir, duct means having one end connected to said hydraulic fluid cylinder and its other end connected to said reservoir, and a check valve in said duct means opening toward said reservoir and biased to closed position whereby, when pressures in said end of said duct means reach a predetermined point, fluid will be bypassed from said hydraulic fluid cylinder through said duct means to said reservoir.

14. Apparatus according to claim 9 provided with a hydraulic fluid reservoir, duct means having one end connected to said hydraulic fluid cylinder and its other end connected to said reservoir, a check valve in said duct means opening toward said reservoir and biased to closed position, a control cylinder, a piston in said control cylinder connected to said check valve, one end of said control cylinder having restricted communication with said hydraulic fluid chamber and the other end forming a part of said duct means whereby, upon the building-up of pressure in said fluid cylinder rapidly relative to the building-up of pressure in said one end of said control cylinder, fluid pressure in said duct means, acting on said piston, will maintain said check valve closed.

15. A booster brake mechanism comprising a master cylinder having a first hydraulic fluid chamber provided with an outlet for connection with vehicle wheel cylinders, a first fluid displacing member movable into said chamber to displace fluid therefrom, a second hydraulic fluid chamber, a second fluid displacing member including a piston movable into said second fluid chamber and including means displacing fluid therefrom into said first fluid chamber, a first spring biasing said second fluid displacing member for movement of said piston from a normal off position to displace fluid from said second chamber, an axial stem carried by said first fluid displacing member and projecting axially of said second fluid displacing member and including means engageable with and limiting movement of said first fluid displacing member into said first fluid chamber relative to said second fluid displacing member, a second spring operatively engaged between said fluid displacing members normally urging said first fluid displacing member to said limit of movement relative to said second fluid displacing member, a fluid motor including a casing and a pressure responsive unit forming first and second motor chambers in said casing, said pressure responsive unit being operatively connected to said second fluid displacing member, pedal operable means operatively connected to said first fluid displacing member and including a lost motion connection with said stem permitting independent movement of said pedal operable means a predetermined distance from a normal off position relative to said stem, an actuating pedal operatively connected to said pedal operable means, and control valve means operatively connected to said actuating pedal and said pedal operable means having fluid connection with said motor chambers and with sources of relatively high and low pressures and having a normal position connecting said first motor chamber to said low pressure source and connecting said second motor chamber to said high pressure source to retract said second fluid displacing member relative to said second hydraulic fluid chamber, said first spring being normally restrained by said pressure responsive member when said valve means is in said normal position.

References Cited in the file of this patent

UNITED STATES PATENTS

| Re. 23,081 | Rockwell | Jan. 25, 1949 |
| 2,078,209 | Sanford et al. | Apr. 20, 1937 |
| 2,106,757 | Oliver | Feb. 1, 1938 |
| 2,106,758 | Oliver | Feb. 1, 1938 |